United States Patent
Currier (10) Patent No.: US 11,619,921 B2
(45) Date of Patent: Apr. 4, 2023

(54) WORK MACHINE OVERLOAD PREVENTION

(71) Applicant: Caterpillar Inc., Peoria, IL (US)

(72) Inventor: Shaun D. Currier, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 310 days.

(21) Appl. No.: 16/947,703

(22) Filed: Aug. 13, 2020

(65) Prior Publication Data

US 2022/0050437 A1   Feb. 17, 2022

(51) Int. Cl.
| | | |
|---|---|---|
| *G05B 19/40* | (2006.01) | |
| *B60P 1/28* | (2006.01) | |
| *G05B 19/406* | (2006.01) | |
| *E01C 19/10* | (2006.01) | |
| *B60P 1/00* | (2006.01) | |

(52) U.S. Cl.
CPC ............. *G05B 19/406* (2013.01); *B60P 1/00* (2013.01); *B60P 1/28* (2013.01); *E01C 19/1063* (2013.01); *G05B 2219/39112* (2013.01); *G05D 2201/0201* (2013.01)

(58) Field of Classification Search
CPC .............. B65F 2210/184; G01G 19/02; G01G 19/414; G05B 19/406; G05B 2219/39112; B60P 1/00; B60P 1/28; E01C 19/1063; G05D 2201/0201
See application file for complete search history.

(56) References Cited

U.S. PATENT DOCUMENTS

| | | | |
|---|---|---|---|
| 4,835,719 A * | 5/1989 | Sorrells ................. | G01G 19/10 |
| | | | 701/1 |
| 4,995,468 A | 2/1991 | Fukuda | |
| 5,070,953 A * | 12/1991 | Kyrtsos .................. | E02F 9/264 |
| | | | 177/139 |
| 5,606,516 A * | 2/1997 | Douglas ................. | G01G 19/02 |
| | | | 177/208 |
| 5,822,224 A | 10/1998 | Nakanishi et al. | |
| 6,211,471 B1 * | 4/2001 | Rocke .................. | G01G 19/083 |
| | | | 177/136 |
| 7,627,410 B2 * | 12/2009 | Berry ...................... | E02F 9/2029 |
| | | | 701/1 |
| 9,221,659 B2 | 12/2015 | Fukasu et al. | |
| 10,024,710 B2 | 7/2018 | Talmaki et al. | |
| 10,234,368 B2 | 3/2019 | Cherney | |

FOREIGN PATENT DOCUMENTS

EP   457134 A *  11/1991 ........... G01G 3/1414

* cited by examiner

*Primary Examiner* — Gregory W Adams
(74) *Attorney, Agent, or Firm* — Harrity & Harrity, LLP (57) ABSTRACT

A controller may obtain initial sensing data to determine an estimated weight associated with each initial load of one or more initial loads of material carried by an implement. The controller may identify an estimated weigh accuracy metric associated with each initial load and an estimated weight accuracy metric associated with a final load to be carried by the implement. The controller may determine a target weight for the final load based on the estimated weights of the one or more initial loads, the estimated weight accuracy metrics of the one or more initial loads, or the estimated weight accuracy metric associated with the final load. The controller may obtain final sensing data to determine an estimated weight associated with the final load and may cause the implement to perform one or more actions based on the estimated weight of the final load and the target weight.

20 Claims, 4 Drawing Sheets

WORK MACHINE OVERLOAD PREVENTION

TECHNICAL FIELD

The present disclosure relates generally to loading a work machine and, for example, preventing overloading of the work machine.

BACKGROUND

A load work machine may utilize sensors (e.g., pressure sensors, strain sensors, and/or the like) installed on an arm, linkage, and/or an implement of the load work machine to measure a weight of a payload of the implement. Such an implement may include, for example, a load carrying bucket. In some cases, the sensors may detect changes in pressure (e.g., of the hydraulic cylinders of the linkage), strain (e.g. of the arm), and/or the like as the implement lifts the payload. A controller of the of the load work machine can calculate the payload weight as a function of the change in pressure, strain, and/or the like. However, due to inherent measurement inaccuracies of the sensors, the calculated payload weight may be different than the actual weight of the payload.

In some cases, the load work machine is to load payload material into a haul work machine, such as a dump truck. The controller of the load work machine may determine a number of loads of the payload material that are to be loaded in the haul work machine to match a weight capacity of the haul work machine. Typically, as the load work machine fills the haul work machine with the payload material, the controller calculates a payload weight of each load and maintains a total payload weight that has been deposited into the haul work machine. Accordingly, the controller may calculate a target weight (e.g., that is less than a weight capacity of the load work machine) of a last load to fill the haul work machine to the weight capacity of the haul work machine and an operator of the load work machine may cause the load work machine to load the target weight of the payload material into the haul work machine. However, the target calculated weight may not be correct (e.g., due to the inherent measurement inaccuracies of the sensors, which can be compounded by the number of loads deposited into the haul work machine), which may cause the haul work machine to be overloaded or underloaded.

U.S. Pat. No. 10,024,710 (the '710 patent) discloses a payload monitoring system. As disclosed in the '710 patent, a controller of the payload monitoring system may determine a discrepancy between a total weight estimate of all the material inside a bed of a haul machine and a sum of incremental weight measurements made during each pass that a load machine fills the haul machine. When the discrepancy is determined to be less than a threshold amount, a calibration process may be implemented, which may include calibration of a load sensor from the haul machine or the load machine.

While the '710 patent may disclose a method for calibrating a load sensor when a discrepancy exists between a total weight estimate of material and a sum of incremental weight measurements of the material, the '710 patent does not disclose any process to compensate for inaccuracy of the measurements other than calibration. Furthermore, the '710 patent does not disclose any type of processing of the measurements to improve an accuracy of the total weight estimate and/or the incremental weight measurements and/or ensure the actual final weight remains under a capacity threshold.

Accordingly, the system of the present disclosure solves one or more of the problems set forth above and/or other problems in the art.

SUMMARY

A method includes obtaining initial sensing data associated with one or more initial loads of material carried by an implement of a load machine; determining, based on the initial sensing data, an estimated weight associated with each initial load of the one or more initial loads; identifying an estimated weight accuracy metric associated with each initial load, of the one or more initial loads, and an estimated weight accuracy metric associated with a final load of material to be carried by the implement of the load machine; determining a target weight for the final load based on the estimated weights of the one or more initial loads, the estimated weight accuracy metrics of the one or more initial loads, or the estimated weight accuracy metric associated with the final load; obtaining final sensing data associated with the final load of material being carried by the implement of the load machine; determining, based on the final sensing data, an estimated weight associated with the final load; and causing the implement of the load machine to perform one or more actions based on the estimated weight of the final load and the target weight.

A controller includes one or more memories; and one or more processors communicatively coupled to the one or more memories, configured to: obtain initial sensing data associated with one or more initial loads of material carried by an implement of a load machine; determine, based on the initial sensing data, an estimated weight and an estimated weight accuracy metric associated with each initial load of the one or more initial loads; determine, based on the estimated weights of the one or more initial loads, a target weight for a final load of material; obtain final sensing data associated with the final load of material; determine, based on the final sensing data, an estimated weight and an estimated weight accuracy metric associated with the final load; adjust the target weight based on the estimated weight accuracy metrics associated with the one or more initial loads and the estimated weight accuracy metric associated with the final load; and cause the implement of the load machine to perform one or more actions based on a difference between the estimated weight of the final load and the adjusted target weight.

A system includes at least one load sensor; and a controller configured to: receive, from the at least one load sensor, initial sensing data associated with one or more initial loads of material carried by an implement of a load machine; determine, based on the initial sensing data, an estimated weight associated with each initial load of the one or more initial loads; determine, based on the estimated weights of the one or more initial loads, a target weight for a final load of material; receive, from the at least one load sensor, final sensing data associated with the final load of material; determine, based on the final sensing data, an estimated weight associated with the final load; determine, based on estimated weight accuracy metrics of the one or more initial loads and an estimated weight accuracy metric associated with the final load, a combined estimated weight accuracy metric; adjust the target weight based on the combined estimated weight accuracy metric; and cause the implement of the load machine to perform one or more actions based on the estimated weight of the final load and the adjusted target weight.

DETAILED DESCRIPTION

This disclosure relates to a controller of a work machine that loads material into another work machine. The controller, as described herein, has universal applicability to any work machine utilizing such a controller. The term "work machine" may refer to any machine that performs an operation associated with an industry such as, for example, mining, construction, farming, transportation, or any other industry. As some examples, the work machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, aerial equipment, or marine equipment.

Figure 1:
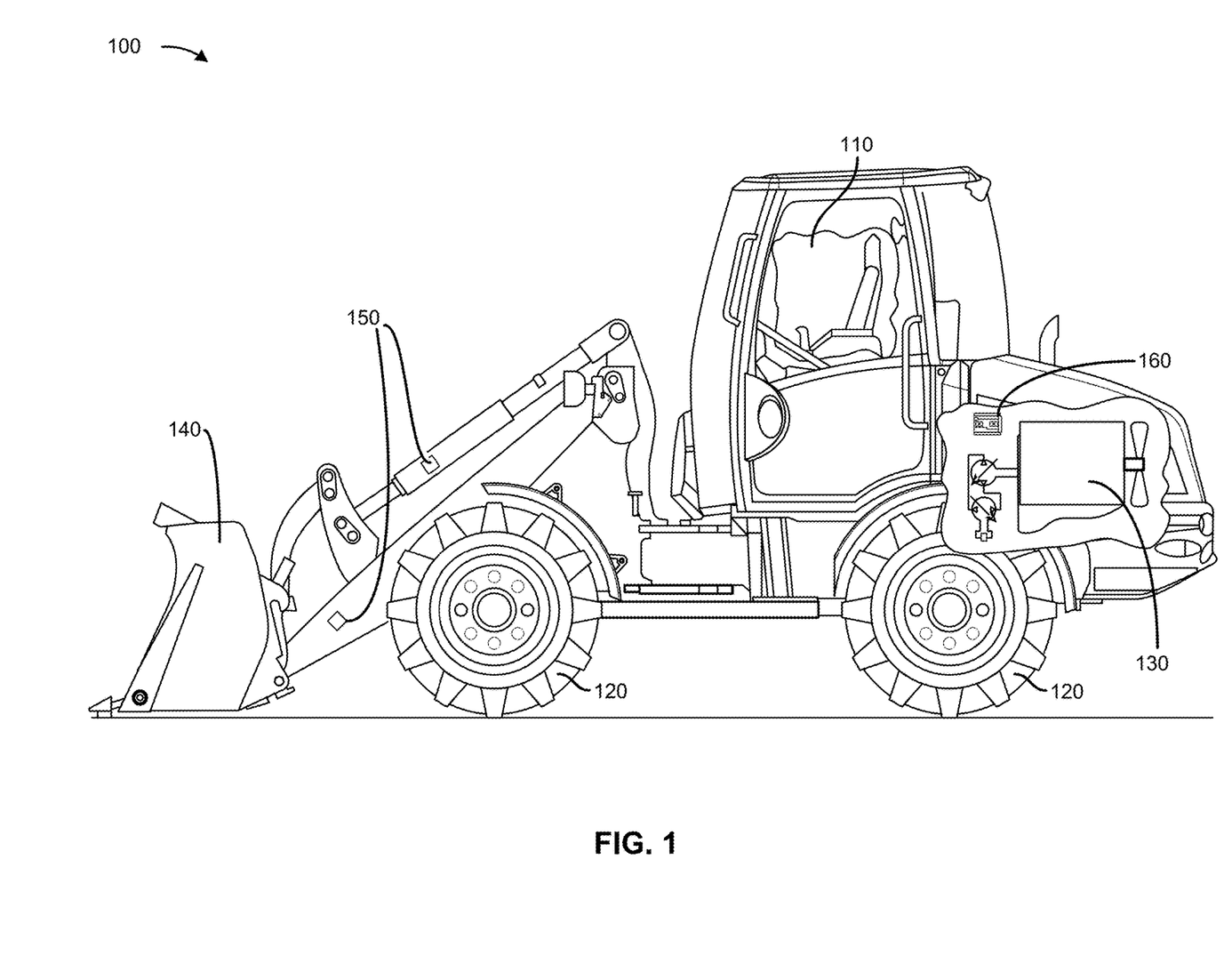
FIG. 1 is a diagram of an example work machine described herein.

FIG. 1 is a diagram of an example work machine 100 described herein. For example, work machine 100 may include a mobile machine, such as the wheel loader shown in FIG. 1, or any other type of mobile machine. Work machine 100 may include an operator station 110, one or more traction devices 120 (sometimes referred to as ground engagements), and an engine 130 operatively connected to provide power to drive at least one of traction devices 120. Operator station 110 may include may include a user interface that allows an operator of work machine 100 to provide inputs for performing one or more machine tasks. Further, operator station 110 may include one or more lights, one or more speakers, one or more displays, and/or the like to provide notifications, alerts, and/or the like to the operator to assist in operating the work machine 100.

Work machine 100 may include an implement 140, such as a bucket, a fork, a grapple, and/or the like for lifting and loading an amount of material (e.g., into another work machine, such as a dump truck). Work machine 100 may include one or more load sensors 150 (e.g., one or more pressure sensors, strain gauges, force gauges, and/or the like) that may detect a pressure, a strain, a force, and/or the like associated with an amount of material held by implement 140 (e.g., while implement 140 is lifting the amount of material for loading). Work machine 100 may also include a controller 160 that is connected to the one or more load sensors 150 and/or one or more other components of work machine 100. Controller 160 may perform operations related to determining a target weight and/or an adjusted target weight for a final load of material to be loaded by implement 140, as described in more detail herein.

As indicated above, FIG. 1 is provided as an example. Other examples may differ from what is described in connection with FIG. 1.

Figure 2:
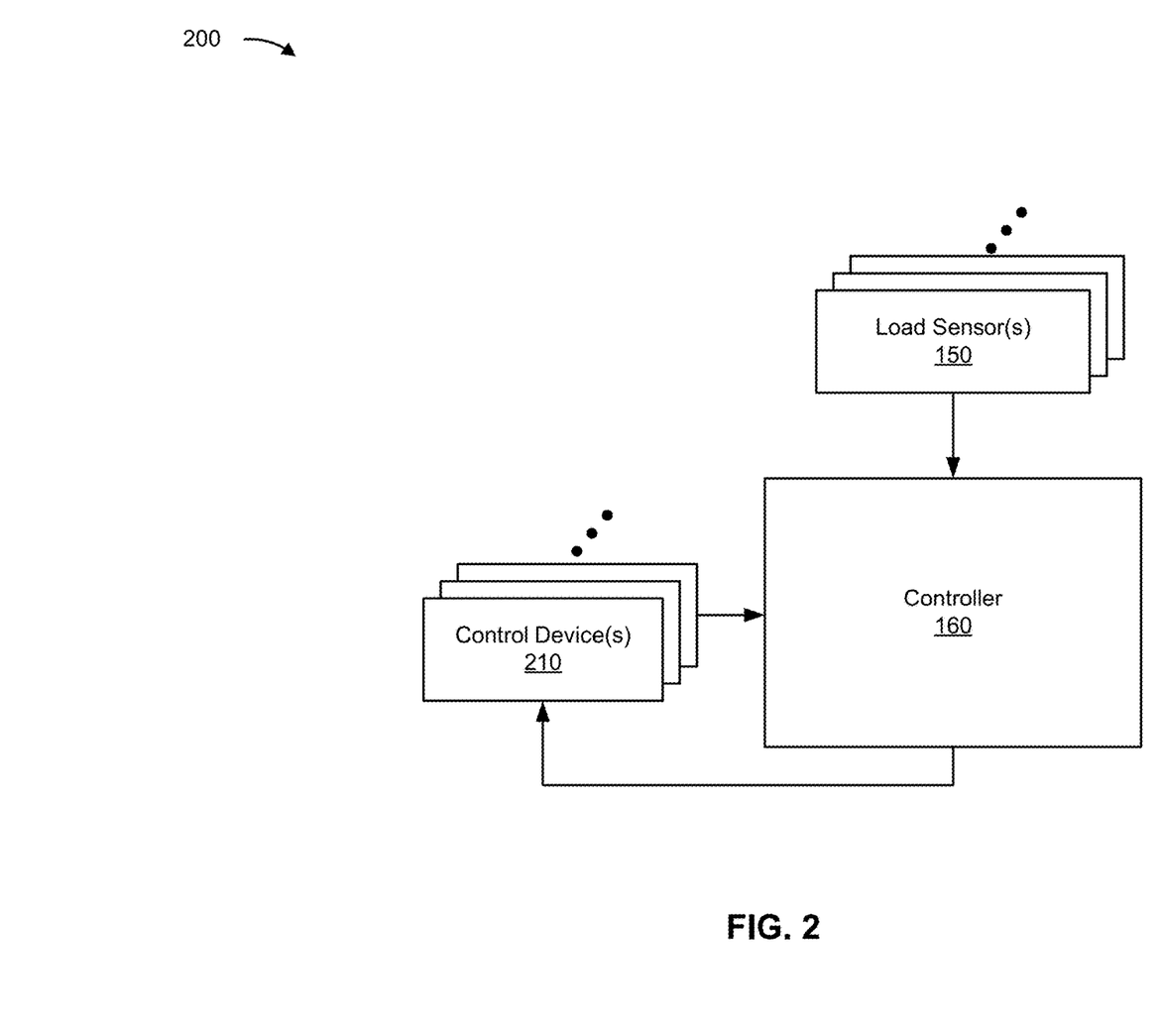
FIG. 2 is a diagram of an example environment described herein.

FIG. 2 is a diagram of an example environment 200 in which systems and/or methods described herein may be implemented. As shown in FIG. 2, environment 200 may include one or more control devices 210 (referred to individually as "control device 210" and collectively as "control devices 210"), one or more load sensors 150 (referred to individually as "load sensor 150" and collectively as "load sensors 150"), and controller 160. Devices and/or components of environment 200 may interconnect via wired connections, wireless connections, or a combination of wired and wireless connections.

Control device 210 may be any type of device that may be used by controller 160 to control a component of work machine 100, such as implement 140. For example, control device 210 may include one or more actuators, switches, and/or the like that are capable of controlling a component of work machine 100. Control device 210 may be capable of causing implement 140 to perform one or more actions to modify an amount of material carried by implement 140. For example, control device 210 may cause implement 140 to perform at least one fill action to add an amount of material to implement 140. As another example, control device 210 may cause implement 140 to perform at least one dump action to remove an amount of material from implement 140.

Load sensors 150 may include any type of sensor configured to measure a load of material carried by implement 140. Load sensors 150 may be attached to implement 140, an arm associated with implement 140, a linkage associated with implement 140, and/or any other component of work machine 100 to allow load sensors 150 to obtain sensing data associated with the load of material carried by implement 140. Load sensors 150 may include a pressure sensor (e.g., to detect an amount of pressure associated with one or more hydraulic cylinders of the linkage associated with implement 140), a strain gauge (e.g., to detect an amount of strain on the arm associated with implement 140), a force gauge (e.g., to detect an amount of force on implement 140), and/or the like. The load sensors 150 may send the sensing data (e.g., that indicates the amount of pressure, the amount of strain, the amount of force, and/or the like, associated with implement 140) to controller 160 on a scheduled basis (e.g., every second, every 20 seconds, every minute, and/or the like), on an on-demand basis (e.g., upon receiving a command from controller 160 to provide the sensing data to controller 160), on a triggered basis (e.g., upon implement 140 lifting a load of material), and/or the like.

Controller 160 may be configured to control one or more components of work machine 100. For example, controller 160 may be configured to control implement 140 (e.g., to cause implementation 140 to perform one or more fill actions and/or dump actions, as described herein). Controller 160 may control the one or more components of work machine 100 by sending one or more commands to control device 210.

Controller 160 may be implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor may be implemented in hardware, firmware, and/or a combination of hardware and software. Controller 160 may include one or more processors capable of being programmed to perform a function. One or more memories, including a random-access memory (RAM), a read only memory (ROM), and/or another type of dynamic or static storage device (e.g., a flash memory, a magnetic memory, and/or an optical memory) may store information and/or instructions for use by controller 160. Controller 160 may include a memory (e.g., a non-transitory computer-readable medium) capable of storing instructions, that when executed, cause the processor to perform one or more processes and/or methods described herein.

Controller 160 may be configured to determine a weight of a load of material carried by implement 140. For example, controller 160 may process (e.g., using a formula, an algorithm, and/or the like) the sensing data captured by load sensors 150 (e.g., that indicates the amount of pressure, the amount of strain, the amount of force, and/or the like, associated with implement 140) to determine the weight of the load of material carried by implement 140.

Controller 160 may identify a load destination for the material carried by implement 140. For example, the operator of the work machine 100 may enter (e.g., via the user interface of operator station 110) an identifier of a haul work machine, such as a dump truck, that that is to receive the material carried by implement 140. Controller 160 may determine (e.g., based on the identifier) a weight capacity of the load destination (e.g., a maximum weight capacity of the load destination, an optimal weight capacity of the load destination, and/or the like). For example, controller 160 may search, based on the identifier, a data structure (e.g., a table, a list, a database, and/or the like) that identifies a respective weight capacity for one or more haul work machines to determine a weight capacity of the haul work machine identified by the operator. Alternatively, the operator may directly enter (e.g., via the user interface of operator station 110) the weight capacity of the load destination.

Controller 160 may identify a weight capacity of work machine 100 (e.g., a maximum weight capacity of work machine 100, an optimal weight capacity of work machine 100, and/or the like). For example, the operator may directly enter (e.g., via the user interface of operator station 110) the weight capacity of work machine 100. As another example, controller 160 may be preconfigured with the weight capacity of work machine 100. The weight capacity of work machine 100 may indicate a weight carrying capacity of implement 140 (e.g., a maximum weight carrying capacity of implement 140, an optimal weight carrying capacity of implement 140, and/or the like).

Controller 160 may determine a number of loads that the work machine 100 is to deposit into the load destination to deposit an amount of material that equals (e.g., matches, within a threshold) the weight capacity of the load destination (herein after referred to a "target total amount of material"). For example, controller 160 may divide the weight capacity of the load destination by the weight capacity of work machine 100 to obtain a quotient and may round the quotient up to the nearest whole number to determine the number of loads.

After determining the number of loads, controller 160 may initiate a loading sequence to facilitate loading of the load destination with the target total amount of material by work machine 100. For example, controller 160 may cause a display of operator station 110 to display information indicating the number of loads to deposit into the load destination, the number of remaining loads that are to be deposited before the load destination is at capacity, and/or the like. Controller 160 may also cause the display to display information indicating a remaining weight of material to be loaded into the load destination (e.g., the target total amount of material). Controller 160 may then allow work machine 100 to obtain a load (e.g., allow the user interface of operator station 110 to accept input from the operator of work machine 100 to cause implement 140 to pick up an amount of material).

Controller 160 may determine an estimated weight of the load. For example, controller 160 may process the sensing data provided by load sensors 150 to determine the estimated weight of the load. Controller 160 may identify an estimated weight accuracy metric associated with the load (e.g., a metric that indicates an amount of error of the estimated weight of the load, such as "plus or minus" a particular amount of weight). For example, controller 160 may communicate with load sensors 150 to obtain sensing accuracy information associated with load sensors 150 and may process the sensing accuracy information to determine the estimated weight accuracy metric. The estimated weight accuracy metric may be based on the amount of material carried by implement 140 (e.g., the greater amount of material carried by implement 140, the higher, or lower, the value of the estimated weight accuracy metric). Alternatively, the estimated weight accuracy metric may be constant, regardless of the amount of material carried by implement 140 (e.g., because the estimated weight accuracy metric is based on unchanging measurement accuracy characteristics of load sensors 150). In this case, controller 160 may be preconfigured with the estimated weight accuracy metric.

Controller 160 may store the estimated weight of the load and the estimated weight accuracy metric associated with the load in a data structure (e.g., a table, a database, and/or the like associated with controller 160). For example, controller 160 may store the estimated weight of the load and the estimated weight accuracy metric associated with the load in an entry of the data structure that identifies a sequence number of the load (e.g., the first load).

Controller 160 may cause the display of operator station 110 to display information indicating the estimated weight of the load (e.g., as work machine 100 carries the load). After work machine 100 deposits the load into the load destination (e.g., after the operator of work machine 100 interacts with the user interface of operator station 110 to cause implement 140 to dump the load into the load destination), controller 160 may update the number of loads to deposit into the load destination (e.g., decrement the number by 1) and/or the remaining weight of material to be loaded into the load destination (e.g., subtract the estimated weight of the load just deposited into the load destination from the remaining weight of material to be loaded into the load destination).

After updating the number of loads to deposit into the load destination and/or the remaining weight of material to be loaded into the load destination, controller 160 may cause the display of operator station 110 to display information indicating the number of loads to deposit into the load destination and/or the remaining weight of material to be loaded into the load destination. Work machine 100 may then obtain a new load (e.g., the operator of work machine 100 may interact with the user interface of operator station 110 to cause implement 140 to pick up an additional amount of material) and controller 160 may determine and store an estimated weight of the new load and/or an estimated weight accuracy metric associated with the new load, in a similar manner as that described above.

Controller 160 may cause the display of operator station 110 to display information indicating the estimated weight of the new load (e.g., as work machine 100 carries the new load), in a similar manner as that described above. After work machine 100 deposits the new load into the load destination (e.g., after the operator of work machine 100 interacts with the user interface of operator station 110 to cause implement 140 to dump the new load into the load destination), controller 160 may update the number of loads to deposit into the load destination and/or the remaining weight of material to be loaded into the load destination, in a similar manner as that described above. Accordingly, controller 160 may perform in this way for each load that work machine 100 obtains, carries, and deposits until work machine 100 is to obtain, carry, and deposit a final load (e.g., when the number of loads to deposit into the load destination is decremented to one).

After work machine 100 deposits a next-to-final load into the load destination, controller 160 may cause the display to display information indicating the number of loads to deposit into the load destination (e.g., indicating that only one load, the final load, is left to deposit into the load destination) and/or the remaining weight of material to be loaded into the load destination (e.g., that is less than or equal to the weight capacity of work machine 100). In some implementations, controller 160 may determine a target weight for the final load of material (e.g., as further described herein in relation to FIG. 3) and may cause the display of the operator station 110 to display information indicating the target weight for the final load of material. Work machine 100 may then obtain the final load (e.g., the operator of work machine 100 may interact with the user interface of operator station 110 to cause implement 140 to pick up a final amount of material).

In some implementations, the operator of work machine 100 (e.g., based on viewing the target weight for the final load of material on the display of operator station 110) may interact with the user interface of operator station 110 to cause implement 140 to attempt to pick up an amount of material that is equal to (e.g., matches, within a tolerance) the target weight for the final load. For example, when the target weight for the final load is half the weight capacity of work machine 100, the operator may cause implement 140 to attempt to pick up an amount of material that fills half of implement 140.

Controller 160 may determine and store an estimated weight of the final load and an estimated weight accuracy metric associated with the final load, in a similar manner as that described above. Controller 160 may cause the display of operator station 110 to display information indicating the estimated weight of the final load (e.g., as work machine 100 carries the final load), in a similar manner as that described above. In some implementations, controller 160 may update the target weight for the final load based on the estimated weight of the final load and/or the estimated weight accuracy metric associated with the final load (e.g., as further described herein in relation to FIG. 3) and may cause the display of the operator station 110 to display information indicating the updated target weight for the final load of material. Additionally, or alternatively, controller 160 may cause the display of the operator station 110 to display information indicating the estimated weights and/or estimated weight accuracy metrics associated with the prior loads that are part of the loading sequence.

Controller 160 may determine a difference between the estimated weight of the final load and the target weight for the final load. When the difference is positive (e.g., the estimated weight of the final load is greater than the target weight for the final load), controller 160 may cause implement 140 to perform one or more dump actions. For example, controller 160 may cause implement 140 to iteratively remove an amount of material from implement 140 until the estimated weight of the final load equals (e.g., matches, within a tolerance) the target weight for the final load. When the difference is negative (e.g., the estimated weight of the final load is less than the target weight for the final load), controller 160 may cause implement 140 to perform one or more fill actions. For example, controller 160 may cause implement 140 to iteratively add an amount of material to implement 140 until the estimated weight of the final load equals (e.g., matches, within a tolerance) the target weight for the final load.

When the difference between the estimated weight of the final load and the target weight for the final load equals (e.g., matches, within a tolerance) zero, controller 160 may allow work machine 100 to carry and deposit the final load into the load destination. For example, controller 160 may allow the user interface of operator station 110 to accept input from the operator of work machine 100 to cause implement 140 to carry the final load and deposit the final load into the load destination. Accordingly, after the final load is loaded into the load destination, controller 160 may initiate a load sequence to facilitate loading of a new load destination by work machine 100, in a similar manner as that described herein.

While some implementations described herein are directed to an operator of work machine 100 interacting with the user interface of operator station 110 to cause work machine 100 to obtain, carry, and/or deposit a load, other implementations are contemplated where work machine 100 is automatically controlled (e.g., by controller 160 or another controller), remotely controlled (e.g., via a wireless connection, such as a cellular connection), and/or the like, to obtain, carry, and/or deposit a load.

As indicated above, FIG. 2 is provided as an example. Other examples may differ from what is described in connection with FIG. 2.

Figure 3:
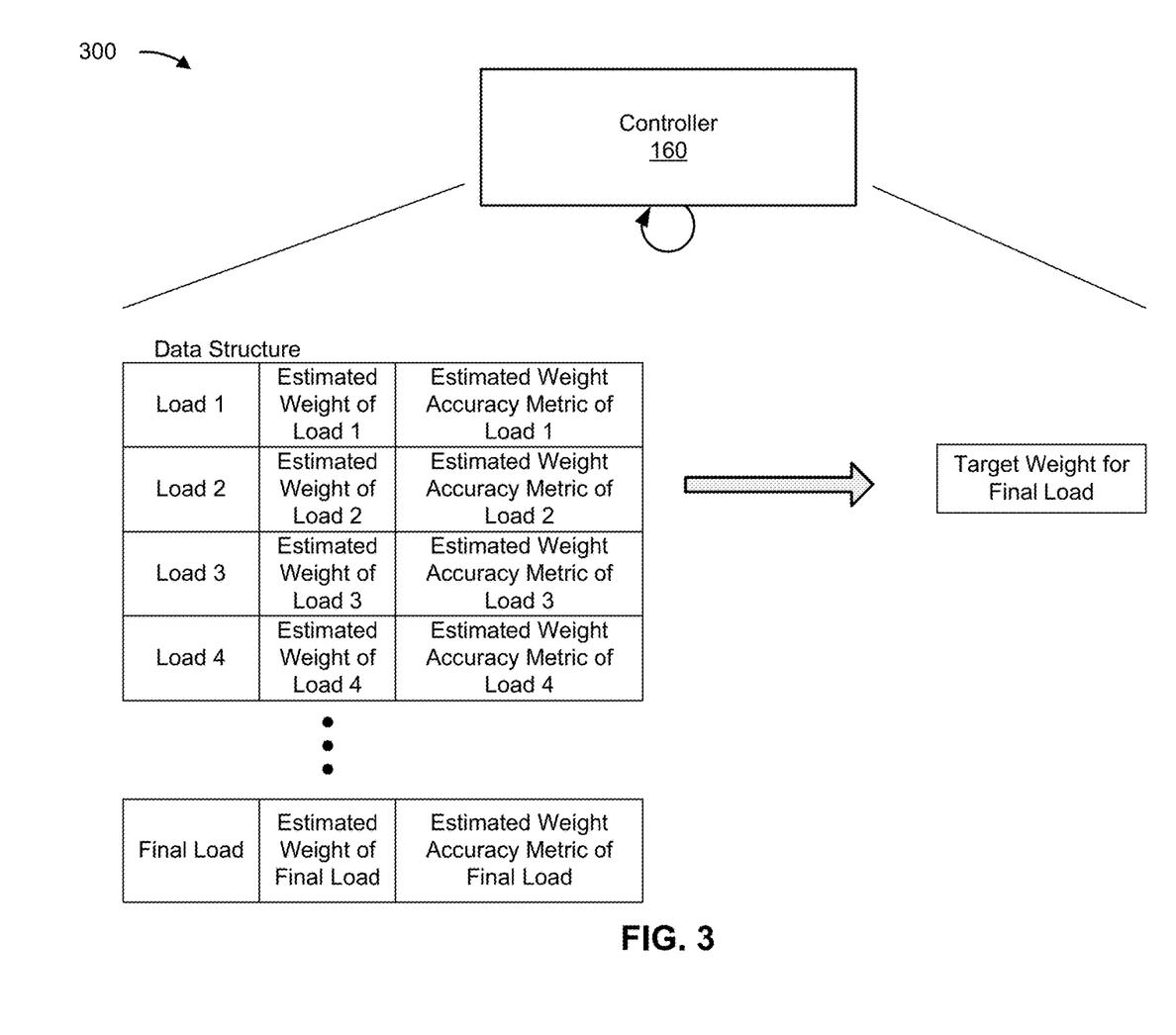
FIG. 3 is a diagram illustrating an example for determining and/or updating a target weight for a final load of material described herein.

FIG. 3 is a diagram 300 illustrating an example for determining and/or updating the target weight for the final load of material described in relation to FIG. 2.

As described above in relation to FIG. 2, controller 160 may determine a target weight for a final load of material to be deposited into the load destination (e.g., after work machine 100 deposits the next-to-final load into the load destination and before work machine 100 obtains the final load). Controller 160 may determine the target weight for the final load based on the estimated weight and/or estimated weight accuracy metric of each load deposited into the load destination. For example, controller 160 may cause the target weight for the final load to be the remaining weight of material to be loaded into the load destination (e.g., the difference between the weight capacity of the load destination and the sum of the estimated weights of the loads deposited into the load destination). As another example, controller 160 may determine the target weight for the final load by subtracting the sum of the estimated weight accuracy metrics of the loads deposited into the load destination from the remaining weight of material to be loaded into the load destination. Controller 160 may process the stored entries of the data structure associated with controller 160 to determine the estimated weights and/or the estimated weight accuracy metrics of the loads deposited into the load destination.

In some implementations, each load deposited into the load destination may have the same estimated weight accuracy metric (e.g., because each estimated weight accuracy metric is based on unchanging measurement accuracy characteristics of load sensors 150). Accordingly, controller 160 may determine the estimated weight accuracy metric of the final load before work machine 100 obtains the final load (e.g., because the estimated weight accuracy metric of the final load is the same as the estimated weight accuracy metrics of the loads deposited into the load destination). Accordingly, controller 160 may determine the target weight for the final load according to the following formulas:

$$t_{b,c} = t_b - c$$

where:
- $t_{b,c}$ is the target weight for the final load (e.g., in tonnes)
- $t_b$ is the nominal remaining weight of material to be loaded into the load destination (e.g., in tonnes)
- c is a combined estimated weight accuracy metric (e.g., in tonnes)

$$t_b = t_t - s$$

where:
- $t_t$ is the weight capacity of the load destination (e.g., in tonnes);
- s is the sum of the estimated weights of the loads deposited into the load destination (e.g., in tonnes);

$$c = \sqrt{\sigma_c^2 + \sigma_f^2}$$

where:
- $\sigma_c^2$ is the variance of the estimated weight of the loads deposited into the load destination (e.g., in tonne$^2$);
- $\sigma_f^2$ is the variance of the estimated weight of the final load (e.g., in tonne$^2$);

$$\sigma_c^2 = n(p_c r)^2$$

$$\sigma_f^2 = (p_f r)^2$$

where:
- n is the number of loads deposited into the load destination (not including the final load);
- $p_c$ is the estimated weight accuracy metric of the loads deposited into the load destination;
- r is the weight capacity of work machine 100 (e.g., in tonnes); and
- $p_f$ is the estimated weight accuracy metric of the final load.

In some implementations, controller 160 may update the target weight for the final load after work machine 100 obtains the final load and controller 160 determines the estimated weight and/or the estimated weight accuracy metric of the final load. For example, controller 160 may update the target weight for the final load based on the estimated weight and/or the estimated weight accuracy metric of the final load and/or the estimated weights and/or the estimated weight accuracy metric of the loads deposited into the load destination in a similar manner as that described above.

As indicated above, FIG. 3 is provided as an example. Other examples may differ from what is described in connection with FIG. 3.

Figure 4:
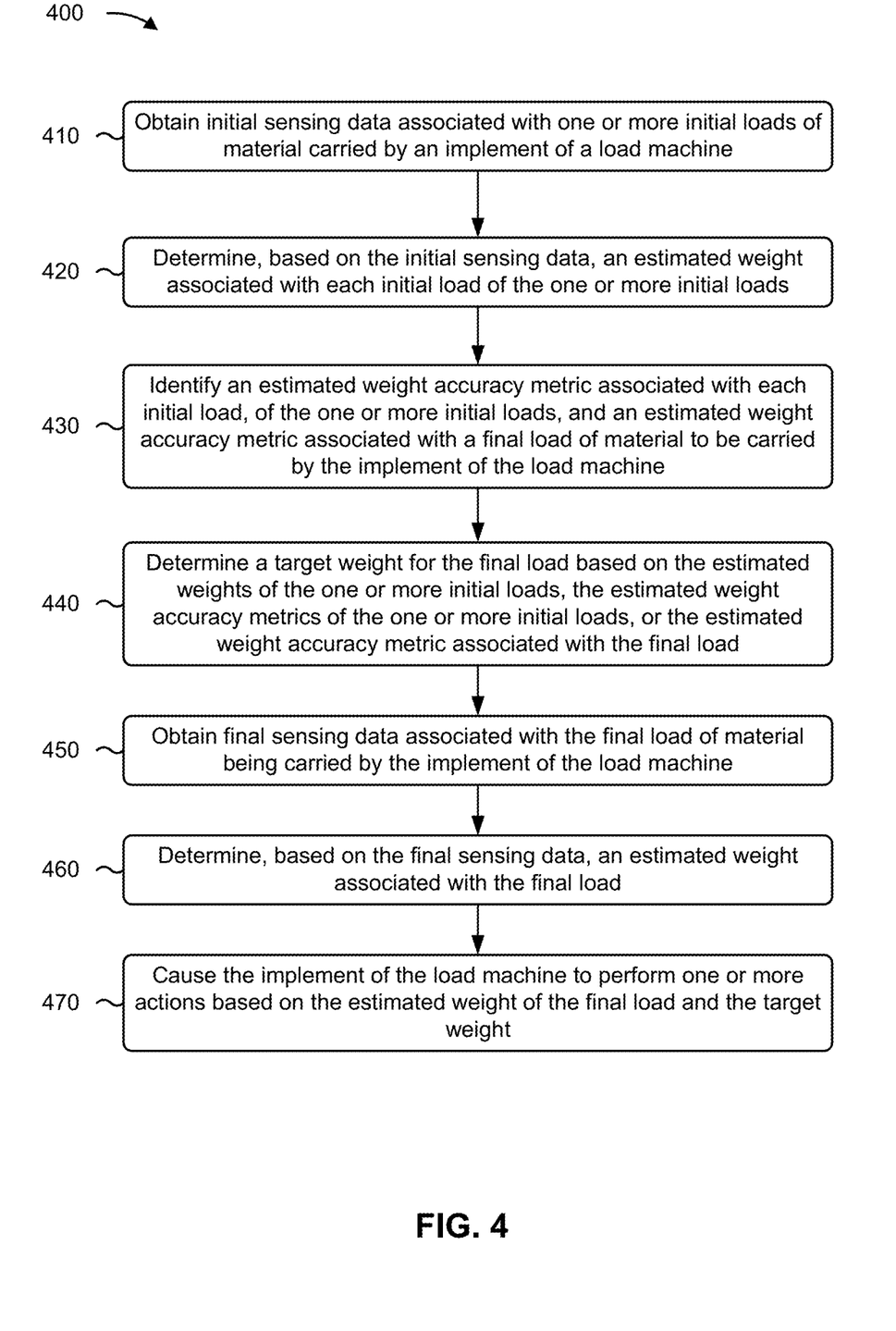
FIG. 4 is a flowchart of an example processes relating to work machine overload prevention.

FIG. 4 is a flowchart of an example process 400 associated with work machine overload prevention. One or more process blocks of FIG. 4 may be performed by a controller (e.g., controller 160). One or more process blocks of FIG. 4 may be performed by another device or a group of devices separate from or including the controller, such as a load sensor (e.g., load sensor 150), a control device (e.g., control device 210), and/or the like.

As shown in FIG. 4, process 400 may include obtaining initial sensing data associated with one or more initial loads of material carried by an implement of a load machine (block 410).

As further shown in FIG. 4, process 400 may include determining, based on the initial sensing data, an estimated weight associated with each initial load of the one or more initial loads (block 420).

As further shown in FIG. 4, process 400 may include identifying an estimated weight accuracy metric associated with each initial load, of the one or more initial loads, and an estimated weight accuracy metric associated with a final load of material to be carried by the implement of the load machine (block 430).

As further shown in FIG. 4, process 400 may include determining a target weight for the final load based on the estimated weights of the one or more initial loads, the estimated weight accuracy metrics of the one or more initial loads, or the estimated weight accuracy metric associated with the final load (block 440). Determining the target weight may comprise determining, based on the estimated weights of the one or more initial loads, a remaining weight of material to be loaded; determining, based on the estimated weight accuracy metrics of the one or more initial loads and the estimated weight accuracy metric associated with the final load, a combined estimated weight accuracy metric, and subtracting the combined estimated weight accuracy metric from the remaining weight of material to be loaded.

As further shown in FIG. 4, process 400 may include obtaining final sensing data associated with the final load of material being carried by the implement of the load machine (block 450).

As further shown in FIG. 4, process 400 may include determining, based on the final sensing data, an estimated weight associated with the final load (block 460).

As further shown in FIG. 4, process 400 may include causing the implement of the load machine to perform one or more actions based on the estimated weight of the final load and the target weight (block 470). The one or more actions may include causing the implement to perform a dump action and/or a fill action.

Process 400 may include additional implementations, such as any single implementation or any combination of implementations described below and/or in connection with one or more other processes described elsewhere herein.

In some implementations, a sum of the estimated weights of the one or more initial loads and the target weight satisfies a threshold. For example, a sum of the estimated weights of the one or more initial loads and the target weight is greater than a minimum total weight threshold and less than a maximum total weight threshold.

In some implementations, the initial sensing data and the final sensing data is obtained from at least one of a pressure sensor; a strain gauge; or a force gauge.

In some implementations, process 400 includes causing a display of the load machine to display at least one of the estimated weights of the one or more initial loads; the estimated weight associated with the final load; or the target weight.

Although FIG. 4 shows example blocks of process 400, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

Some implementations described herein enable a controller of a load work machine to facilitate the load work machine in depositing an amount of material into a haul work machine without overloading or underloading the haul work machine. For example, the controller allows the load work machine to deposit one or more initial loads of material and a final load of material into the haul work machine such that a sum of respective estimated weights of the one or more initial loads and the final load are greater than a minimum total weight threshold (e.g., an underloading threshold) of the haul work machine and/or less than a maximum total weight threshold (e.g., an overloading threshold) of the haul work machine.

As a result, the haul work machine is able to haul an optimal amount of material every time the haul work machine is loaded by the load work machine. This may prevent unnecessary wear and tear on components of the haul work machine that would otherwise be caused by hauling an overloaded amount of material. Moreover, this may minimize a number of trips the haul work machine needs to make to haul a particular total amount of material (e.g., by ensuring that the haul truck does not haul underloaded amounts of material), which may further prevent unnecessary wear and tear on the components of the haul work machine that would otherwise be caused by hauling underloaded amounts of material. Further, this may prevent the haul work machine from having to return to a fill site to remove excess material from the haul work machine when the haul work machine has been determined to be overloaded (e.g., at a weigh station along a highway, at a weigh station when exiting the loading site, and/or the like), thereby preventing additional wear and tear on the components of the haul work machine.

What is claimed is:

1. A method, comprising:
   obtaining initial sensing data associated with one or more initial loads of material carried by an implement of a load machine;
   determining, based on the initial sensing data, an estimated weight associated with each initial load of the one or more initial loads;
   identifying an estimated weight accuracy metric associated with each initial load, of the one or more initial loads, and an estimated weight accuracy metric associated with a final load of material to be carried by the implement of the load machine;
   determining, based on the estimated weight accuracy metrics associated with the one or more initial loads and the estimated weight accuracy metric associated with the final load, a combined estimated weight accuracy metric;
   determining a target weight for the final load based on the estimated weights of the one or more initial loads, and the combined estimated weight accuracy metric;
   obtaining final sensing data associated with the final load of material being carried by the implement of the load machine;
   determining, based on the final sensing data, an estimated weight associated with the final load; and
   causing the implement of the load machine to perform one or more actions based on the estimated weight of the final load and the target weight.

2. The method of claim 1, wherein determining the target weight comprises:
   determining, based on the estimated weights of the one or more initial loads, a remaining weight of material to be loaded;
   and
   subtracting the combined estimated weight accuracy metric from the remaining weight of material to be loaded.

3. The method of claim 1, wherein a sum of the estimated weights of the one or more initial loads and the target weight satisfies a threshold.

4. The method of claim 1, wherein a sum of the estimated weights of the one or more initial loads and the target weight is greater than a minimum total weight threshold and less than a maximum total weight threshold.

5. The method of claim 1, wherein causing the implement of the load machine to perform the one or more actions comprises at least one of:
   causing the implement to perform a dump action; or
   causing the implement to perform a fill action.

6. The method of claim 1, the initial sensing data and the final sensing data is obtained from at least one of:
   a pressure sensor;
   a strain gauge; or
   a force gauge.

7. The method of claim 1, further comprising:
   causing a display of the load machine to display at least one of:
   the estimated weights of the one or more initial loads;
   the estimated weight associated with the final load; or
   the target weight.

8. A controller, comprising:
   one or more memories; and
   one or more processors, communicatively coupled to the one or more memories, configured to:
   obtain initial sensing data associated with one or more initial loads of material carried by an implement of a load machine;
   determine, based on the initial sensing data, an estimated weight and an estimated weight accuracy metric associated with each initial load of the one or more initial loads;
   determine, based on the estimated weights of the one or more initial loads, a target weight for a final load of material;
   obtain final sensing data associated with the final load of material;
   determine, based on the final sensing data, an estimated weight associated with the final load and an estimated weight accuracy metric associated with the final load;
   determine, based on the estimated weight accuracy metric associated with the one or more initial loads and the estimated weight accuracy metric associated with the final load, a combined estimated weight accuracy metric;
   adjust the target weight based on the combined estimated weight accuracy metric; and
   cause the implement of the load machine to perform one or more actions based on a difference between the estimated weight of the final load and the adjusted target weight.

9. The controller of claim 8, wherein, to adjust the target weight, the one or more processors are configured to:
subtract the combined estimated weight accuracy metric from the target weight.

10. The controller of claim 8, wherein a sum of the estimated weights of the one or more initial loads and the adjusted target weight is greater than a minimum total weight threshold and less than a maximum total weight threshold.

11. The controller of claim 8, wherein the one or more processors are configured to, when causing the implement of the load machine to perform the one or more actions, cause the implement to perform a dump action or a fill action.

12. The controller of claim 8, wherein the initial sensing data and the final sensing data are associated with at least one of:
a pressure associated with the implement of the load machine;
a strain associated with the implement of the load machine; or
a force associated with the implement of the load machine.

13. The controller of claim 8, wherein the one or more processors are further configured to:
cause a display of the load machine to display at least one of:
the estimated weights of the one or more initial loads;
the estimated weight associated with the final load;
the target weight; or
the adjusted target weight.

14. A system comprising:
at least one load sensor; and
a controller configured to:
receive, from the at least one load sensor, initial sensing data associated with one or more initial loads of material carried by an implement of a load machine;
determine, based on the initial sensing data, an estimated weight associated with each initial load of the one or more initial loads;
determine, based on the estimated weights of the one or more initial loads, a target weight for a final load of material;
receive, from the at least one load sensor, final sensing data associated with the final load of material;
determine, based on the final sensing data, an estimated weight associated with the final load;
determine, based on estimated weight accuracy metrics of the one or more initial loads and an estimated weight accuracy metric associated with the final load, a combined estimated weight accuracy metric;
adjust the target weight based on the combined estimated weight accuracy metric; and
cause the implement of the load machine to perform one or more actions based on the estimated weight of the final load and the adjusted target weight.

15. The system of claim 14, wherein the controller is configured to, when adjusting the target weight:
subtract the combined estimated weight accuracy metric from the target weight.

16. The system of claim 14, wherein the controller is configured to, when causing the implement of the load machine to perform the one or more actions:
determine that the estimated weight of the final load is greater than the adjusted target weight;
determine a difference between the estimated weight of the final load and the adjusted target weight; and
cause the implement to perform at least one dump action to remove an amount of material from the final load that is equal to the difference.

17. The system of claim 14, wherein the controller is configured to, when causing the implement of the load machine to perform the one or more actions:
determine that the estimated weight of the final load is less than the adjusted target weight;
determine a difference between the estimated weight of the final load and the adjusted target weight; and
cause the implement to perform at least one fill action to add an amount of material to the final load that is equal to the difference.

18. The system of claim 14, wherein the controller is further configured to:
cause, after determining the target weight and before receiving the final sensing data, the target weight to be displayed on a display of the load machine; and
cause, after adjusting the target weight and before causing the implement of the load machine to perform the one or more actions, the adjusted target weight to be displayed on the display of the load machine.

19. The system of claim 14, wherein the at least one load sensor includes at least one of:
a pressure sensor;
a strain gauge; or
a force gauge.

20. The system of claim 14, wherein a sum of the estimated weights of the one or more initial loads and the adjusted target weight is greater than a minimum total weight threshold and less than a maximum total weight threshold.

* * * * *